United States Patent
Arimatsu et al.

(10) Patent No.: US 9,531,226 B2
(45) Date of Patent: Dec. 27, 2016

(54) ROTOR OF INTERNAL PERMANENT MAGNET SYNCHRONOUS MOTOR AND INTERNAL PERMANENT MAGNET SYCNRONOUS MOTOR

(71) Applicant: FANUC CORPORATION, Yamanashi (JP)

(72) Inventors: Yohei Arimatsu, Yamanashi (JP); Kenji Kawai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 152 days.

(21) Appl. No.: 14/108,777

(22) Filed: Dec. 17, 2013

(65) Prior Publication Data
US 2014/0167551 A1    Jun. 19, 2014

(30) Foreign Application Priority Data
Dec. 18, 2012   (JP) .................................. 2012-275698

(51) Int. Cl.
   *H02K 1/27*   (2006.01)

(52) U.S. Cl.
   CPC ............ *H02K 1/276* (2013.01); *H02K 1/2766* (2013.01)

(58) Field of Classification Search
   CPC ..... H02K 1/276; H02K 1/2766; H02K 1/2773
   USPC ........................................ 310/156.53, 156.56
   See application file for complete search history.

(56) References Cited

U.S. PATENT DOCUMENTS

| | | | |
|---|---|---|---|
| 2006/0066168 | A1* | 3/2006 | Shoykhet ........................ 310/211 |
| 2010/0117475 | A1 | 5/2010 | Leonardi et al. |
| 2011/0193439 | A1* | 8/2011 | Yabe et al. ................ 310/156.38 |
| 2014/0125184 | A1* | 5/2014 | Takahashi ................ 310/156.53 |

FOREIGN PATENT DOCUMENTS

| | | |
|---|---|---|
| DE | 102008032172 A1 | 2/2009 |
| DE | 102008004225 A1 | 7/2009 |
| DE | 102010043224 A1 | 5/2012 |
| JP | 2002359942 A | 12/2002 |
| JP | 2004072845 A | 3/2004 |
| JP | 2004236471 A | 8/2004 |

(Continued)

OTHER PUBLICATIONS

English Machine Translation of Abstract for Japanese Publication No. 2011097754 published May 12, 2011, 1 page.

(Continued)

*Primary Examiner* — Terrance Kenerly
(74) *Attorney, Agent, or Firm* — Fredrikson & Byron, P.A.

(57) ABSTRACT

A rotor of an internal permanent magnet synchronous motor including a rotor core, a plurality of slots formed in the rotor core, and a plurality of permanent magnets housed in the plurality of slots. Each of the slots includes a holding part formed between a first outside diameter surface and a first inside diameter surface to hold each of the permanent magnets, and an opening part formed at both sides of the holding part and formed by a second outside diameter surface, a second inside diameter surface and a connecting surface connecting them. The second outside diameter surface is formed to a curved shape so that a distance to an outer circumferential surface of the rotor core in the diametrical direction gradually becomes smaller from both ends of the second outside diameter surface to an intermediate part in the circumferential direction.

11 Claims, 6 Drawing Sheets

(56) References Cited

FOREIGN PATENT DOCUMENTS

| JP | 200425446 A | 9/2004 |
| JP | 2008154299 A | 7/2008 |
| JP | 2008278591 A | 11/2008 |
| JP | 2009095109 A | 4/2009 |
| JP | 2011097754 A | 5/2011 |
| JP | 2012186889 A | 9/2012 |

OTHER PUBLICATIONS

English Machine Translation of Abstract for Japanese Publication No. 2008278591 published Nov. 13, 2008, 1 page.
English Machine Translation of Abstract for Japanese Publication No. 2004236471 published Aug. 19, 2004, 1 page.
Untranslated Office Action for Japanese Application No. 2012-275698 dated May 13, 2014, 3 pages.
Machine Translation of Office Action for Japanese Application No. 2012-275698 dated May 13, 2015, 3 pages.
Untranslated Office Action for Japanese Application No. 2012-275698 dated Sep. 19, 2014, 2 pages.
Machine Translation of Office Action for Japanese Application No. 2012-275698 dated Sep. 19, 2014, 2 pages.
Untranslated Decision to Grant a Patent for Japanese Application No. 2012-275698 dated Feb. 26, 2015, 3 pages.
Machine Translation of Decision to Grant a Patent for Japanese Application No. 2012-275698 dated Feb. 26, 2015, 3 pages.
English Translation of German Publication No. 102010043224, published May 3, 2012, 10 pages.
English Translation of German Publication No. 102008032172, published Feb. 26, 2009, 12 pages.
English Translation of German Publication No. 102008004225, published Jul. 16, 2009, 10 pages.
English Translation of Japanese Publication No. 2004254466, published Sep. 9, 2004, 8 pages.
English Translation of Japanese Publication No. 2002359942, published Dec. 13, 2002, 7 pages.

\* cited by examiner

ROTOR OF INTERNAL PERMANENT MAGNET SYNCHRONOUS MOTOR AND INTERNAL PERMANENT MAGNET SYCNRONOUS MOTOR

BACKGROUND OF THE INVENTION

1. Field of the Invention

The present invention relates to a rotor of an internal permanent magnet synchronous motor which can rotate at a high speed and to an internal permanent magnet synchronous motor.

2. Description of the Related Art

An internal permanent magnet synchronous motor is known, which provides a plurality of magnet holding holes in the circumferential direction of a substantially cylindrically shaped rotor core and which embeds permanent magnets in the magnet holding holes so as to form a rotor. For example, in the electric motor which is described in Japanese Patent Publication No. 3533209 (JP3533209B), each magnet holding hole is formed by mutually facing straight shaped outside and inside walls, end walls which extend from the ends of the outer wall in the circumferential direction, and passage walls which connect the end walls and the inside wall. Further, a magnet is buried between the outside wall and inside wall. Gaps are formed at the both sides of the magnet in the circumferential direction (inside diameter sides of end walls). Furthermore, the outer circumferential surface of the rotor core at the outsides of the end walls in the diametrical direction is provided with recessed parts parallel to the end walls. Between the end walls and the recessed parts, bridge parts of constant thickness in the diametrical direction are formed.

The rotor described in JP3533209B has thin bridge parts of constant thicknesses at the outsides of the gaps in the diametrical direction. The cross-sectional shape of the rotor core rapidly changes at the both ends of the end walls in the circumferential direction. For this reason, stress concentrates at the both ends of the end walls of the rotor core, and thus when making the rotor turn, the centrifugal force is liable to cause the thin bridge parts to break.

SUMMARY OF THE INVENTION

One aspect of the present invention is a rotor of an internal permanent magnet synchronous motor includes a rotor core rotating about an axis; a plurality of slots formed in the rotor core at a plurality of locations in a circumferential direction and extending in parallel to the axis; and a plurality of permanent magnets housed in the plurality of slots, the plurality of permanent magnets being housed so that, in the slots adjoining each other in the circumferential direction, poles different from each other in a diametrical direction are positioned. Each of the plurality of slots of this rotor core includes a holding part formed between a first outside diameter surface extending in the circumferential direction and a first inside diameter surface facing the first outside diameter surface and extending in the circumferential direction at an inside from the first outside diameter surface in the diametrical direction, so as to hold each of the plurality of permanent magnets, and an opening part formed at both sides of the holding part in the circumferential direction, the opening part being formed by a second outside diameter surface extending from the first outside diameter surface in the circumferential direction, a second inside diameter surface extending from the first inside diameter surface in the circumferential direction, and a connecting surface connecting the second outside diameter surface and the second inside diameter surface. Further, the second outside diameter surface is formed to a curved shape so that a distance to an outer circumferential surface of the rotor core in the diametrical direction gradually becomes smaller from both ends of the second outside diameter surface in the circumferential direction to an intermediate part in the circumferential direction.

Further, an internal permanent magnet synchronous motor according to another aspect of the present invention includes the above rotor and a stator arranged around the rotor.

BRIEF DESCRIPTION OF THE DRAWINGS

The objects, features, and advantages of the present invention will become clearer from the following description of embodiments in relation to the attached drawings. In the attached drawings.

DETAILED DESCRIPTION

Figure 1:
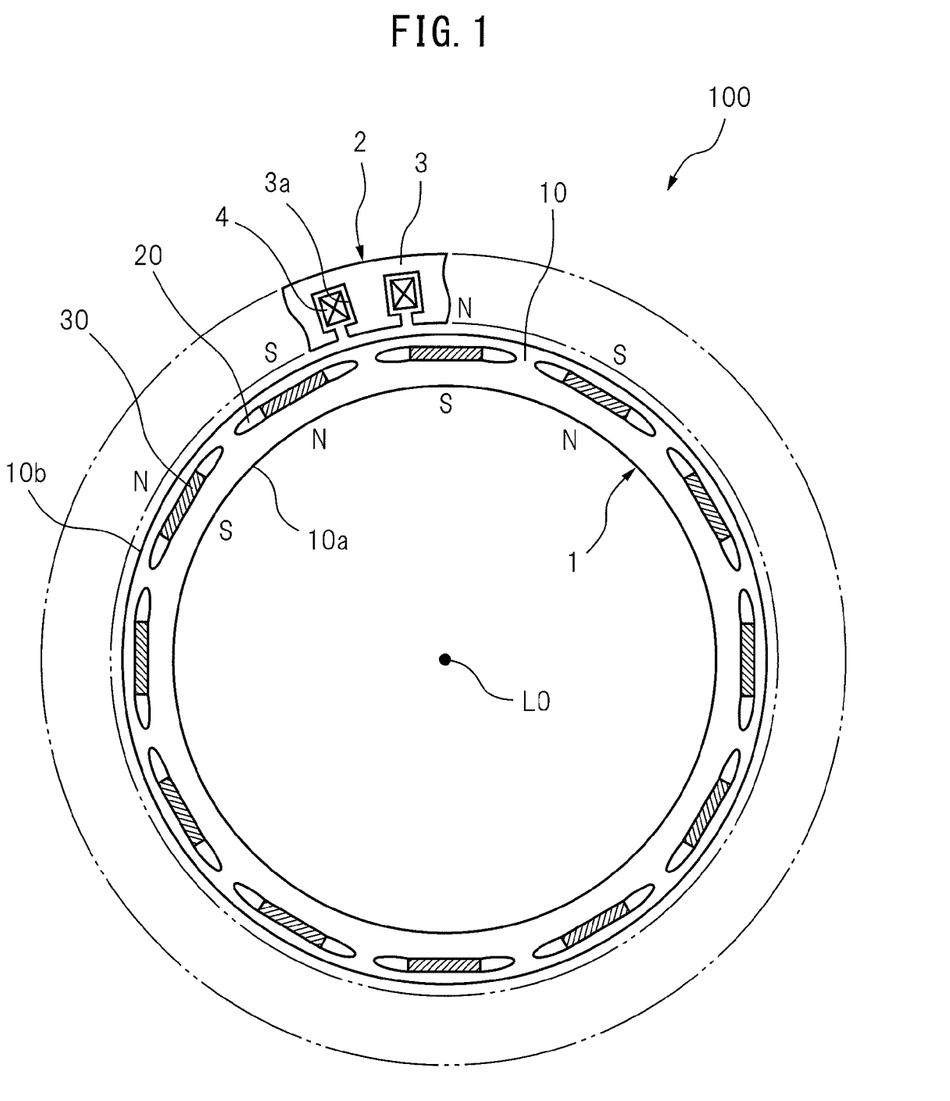
FIG. 1 is a cross-sectional view which shows the schematic configuration of an internal permanent magnet synchronous motor according to an embodiment of the present invention.

Below, an internal permanent magnet synchronous motor according to an embodiment of the present invention will be explained with reference to FIG. 1 to FIG. 8. FIG. 1 is a cross-sectional view which shows a schematic configuration of an internal permanent magnet synchronous motor according to an embodiment of the present invention. The electric motor 100 shown in FIG. 1 has a substantially cylindrically shaped rotor 1 which rotates about an axis L0 and a substantially cylindrically shaped stator 2 (illustration of part in the circumferential direction omitted) which is arranged around the rotor 1 so as to surround the entire circumference of the rotor 1. The stator 2 has a stator core 3 which is comprised of electrical steel sheets stacked in the axial direction. At the inner circumferential surface of the stator core 3, a plurality of slot grooves 3a are formed in the circumferential direction toward the outside in the diametrical direction. A coil 4 is arranged in the slot grooves 3a.

The rotor 1 has a rotor 10 which is comprised of electrical steel sheets stacked in the axial direction and which has a cylindrically shaped inner circumferential surface 10a and outer circumferential surface 10b across its entire circumference, a plurality of slots 20 which are formed at the rotor core 10 at a plurality of locations in the circumferential direction and which extend in parallel to the axis L0, and a plurality of permanent magnets 30 which are fit (embedded) into the slots 20. The magnets 30 are housed so that mutually different poles are positioned in the diametrical direction in the slots 20 which adjoin each other in the circumferential direction. Therefore, N poles and S poles are alternately formed along the outer circumferential surface 10b of the rotor core 10. In the figure, the number of poles becomes twelve. The rotor 1 rotates in synchronization with a rotating magnetic field by running a three-phase alternating current through the coil 4 so as to generate the rotating magnetic field.

The electric motor 100 according to the present embodiment is, for example, assembled into a spindle of a machine tool as a built-in motor. That is, the inner circumferential surface 10a of the rotor core 10 is fastened to the outer circumferential surface of the spindle by shrink fitting, etc. In general, the spindle of a machine tool is required to have a high rigidity so as to secure a sufficient machining precision. In order to raise the rigidity of the spindle, it is necessary to increase the size of the spindle and increase the cross-sectional secondary moment. For this reason, the rotor 1 has a relatively large inside diameter which corresponds to the diameter of the spindle. On the other hand, the rotor 1 is required to have the function of making the spindle rotate at a high speed. Therefore, it is necessary to suppress the maximum stress of the rotor 1 which acts due to the centrifugal force.

Figure 2:
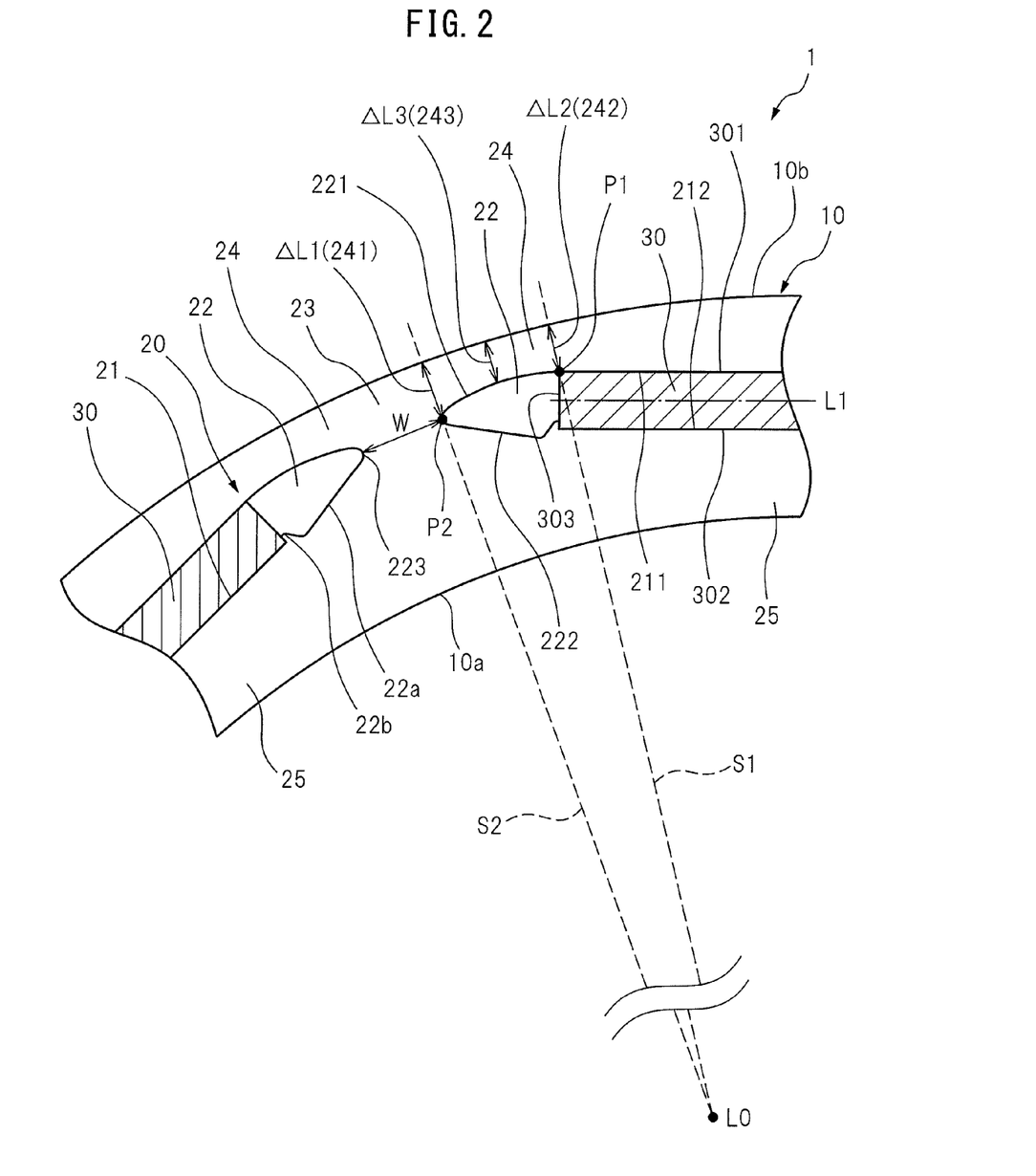
FIG. 2 is an enlarged view which shows the principal configuration of a rotor of FIG. 1.

FIG. 2 is an enlarged view which shows the configuration of principal parts of the rotor 1 of FIG. 1, and in particular, shows the shape of an end of a slot 20. As shown in FIG. 2, the slot 20 has a holding part 21 in which a magnet 30 is held and an opening part 22 which is connected to the holding part 21 and opened to the side of the holding part 21. As shown in FIG. 1, the slot 20 and magnet 30 exhibit symmetric shapes in the circumferential direction. The opening part 22 is formed at the both sides of the holding part 21 in the circumferential direction. For this reason, as shown in this FIG. 2, the rotor core 10 has a tooth part 23 (q-axis tooth part) which extends from the inner circumferential surface 10a to the outer circumferential surface 10b in the diametrical direction between an opening part 22 and opening part 22 which adjoin each other in the circumferential direction.

The tooth part 23 contributes to the generation of a reluctance torque of the rotor 1. Therefore, in order to increase the reluctance torque, it is preferable that the width W in the circumferential direction (q-axis tooth width) be as large as possible. On the other hand, if increasing the q-axis tooth width, the magnets 30 become narrower in width. As a result, the magnetic flux decreases, the inductance becomes larger, and the voltage is liable to become insufficient. The q-axis tooth width is set considering this point. That is, if raising the degree of utilization of the reluctance torque, the q-axis tooth width is increased. If it is not necessary to raise the degree of utilization of the reluctance torque, the q-axis tooth width is made smaller.

Figure 3:
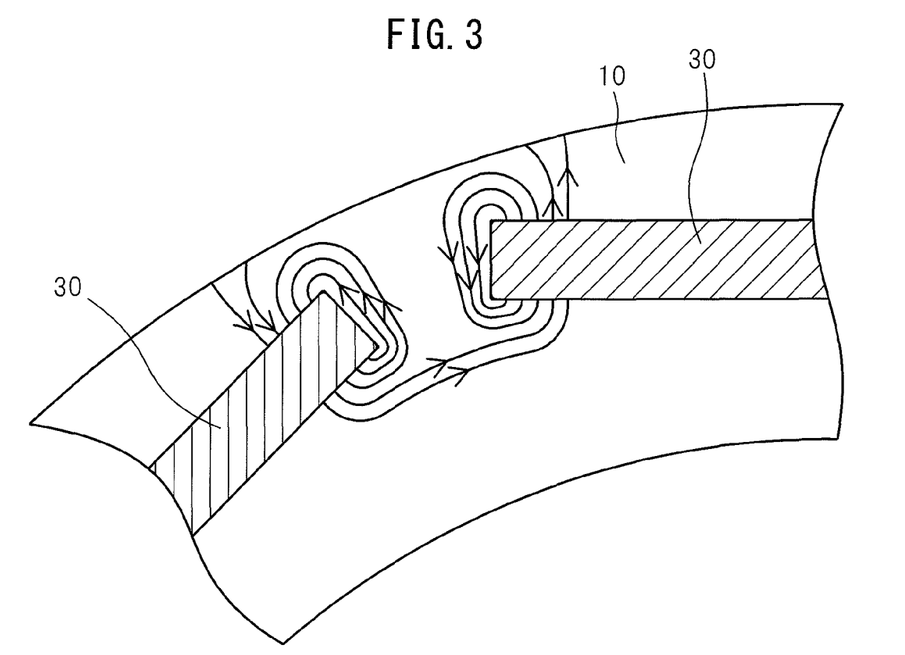
FIG. 3 is a view which shows a comparative example of FIG. 2.

The opening parts 22 are provided to prevent short-circuiting of the magnetic flux at the sides of the magnets 30. For example, as shown in FIG. 3, if there are no opening parts 22 at the sides of the magnets 30, parts of the magnetic flux do not pass through the stator 2, but, as shown by the arrows of the figure, sneak around to the opposite pole sides of the magnets 30. That is, the magnetic flux short-circuits. Such short-circuiting of the magnetic flux does not contribute to generation of torque, so short-circuiting of the magnetic flux can be suppressed as much as possible. Therefore, in the present embodiment, as shown in FIG. 2, parts (opening parts 22) where there are no electrical steel sheets (so-called iron core) are provided at the sides of the magnets 30 so that the magnetic flux efficiently passes through the stator 2. The opening parts 22 may be simple spaces or may be filled with a resin or other nonmagnetic material.

In such an internal permanent magnet electric motor 100, the regions where the stress which acts on the rotor core 10 easily becomes higher when the rotor 1 rotates are the parts at the outside of the opening parts 22 in the diametrical direction (below, called the "bridge parts 24") and the iron core parts at the inside diameter side of the slots 20 (below, called the "slot inside diameter parts 25"). Among these, the parts at the inside diameter side of the slots 20 particularly become larger in stress at the parts of the slot inside diameter parts 25 where the thickness in the diametrical direction (cross-sectional area) becomes smallest. The maximum stress of the slot inside diameter parts 25 can be reduced by making the inside diameter of the rotor 1 smaller or otherwise suitably changing the cross-sectional area.

On the other hand, regarding the bridge parts 24, even if reducing the inside diameter of the rotor 1, no effect of reduction of stress can be obtained. The reason is that, due to the centrifugal force caused by the mass of the magnets 30 and the centrifugal force caused by the mass of the parts of the slots 20 of the rotor core 10 at the outside in the diametrical direction, a tensile stress in the circumferential direction mainly acts on the bridge parts 24. In particular, in the present embodiment, since the rotor 1 rotates at a high speed, the stress which acts near the bridge parts easily becomes large. Therefore, in the present embodiment, in order to reduce the maximum stress which acts near the bridge parts, the rotor 1 is configured as follows. A breakage at the slot inside diameter parts 25 causes great damage to the electric motor as a whole. Therefore, the rotor is preferably configured so that the maximum stress of the slot inside diameter parts 25 becomes smaller than the maximum stress of the bridge parts 24.

As shown in FIG. 2, the holding part 21 of the slot 20 is formed from an outside diameter side holding edge 211 which extends in the tangential direction of a circle about the axis L0 and an inside diameter side holding edge 212 which extends in the tangential direction of a circle about the axis L0 at the inside diameter side from the outside diameter side holding edge 211 and which faces the outside diameter side holding edge 211. The pair of holding edges 211 and 212 extend in parallel with each other in straight shapes. A cross-sectional rectangular shape magnet 30 is fit in the holding part 21.

The lengths of a pair of pole faces 301 and 302 which form an N pole and S pole of the magnet 30 are longer than the pair of side faces 303 which intersect the pole faces 301 and 302, and each magnet 30 exhibits a cross-sectional rectangular shape. If defining the orientation of the magnet 30 by the center line L1 which passes through the centers of the pole faces 301 and 302, the magnet 30 (center line L1) extends in the tangential direction of a circle about the axis L0.

The magnet 30 is preferably comprised of a magnet with a larger magnetic energy than a ferrite magnet, for example, a rare earth magnet. As the rare earth magnet, for example, a neodymium-iron-boron-based rare earth magnet may be used. Due to this, it is possible to reduce the thickness of the magnet 30 and possible to easily increase the inside diameter of the rotor 1. Further, if making the magnet 30 thin, the centrifugal force due to the mass of the magnet 30 is decreased, so it is possible to reduce the stress which acts on the bridge part 24.

Each opening part 22 of a slot 202 is formed by an outside diameter side opening edge 221 which extends from the outside diameter side holding edge 211 in the circumferential direction, an inside diameter side opening edge 222 which faces the outside diameter side opening edge 221 and extends from the inside diameter side holding edge 212 in the circumferential direction, and a connecting edge 223 which connects the outside diameter side opening edge 221 and the inside diameter side opening edge 222. The slot 20 extends in parallel to the axis L0, while the edges 211, 212, and 221 to 223 of FIG. 2 define surfaces which extend in the axial direction.

The broken line S1 in the figure is a line which connects a connection point P1 between the outside diameter side holding edge 211 and the outside diameter side opening edge 221 with the axis L0, while the broken line S2 is a line which connects a point P2 on the connecting edge 223 where the width W of the tooth part 23 becomes the smallest with the axis L0. The region which is surrounded by these broken lines S1 and S2, the outside diameter side opening edge 221, and the outer circumferential surface 10b of the rotor core 10 becomes the bridge part 24.

The outside diameter side opening edge 221 is formed by a smooth curve which projects out to the outside in the diametrical direction (for example, circular arc with a radius of curvature of r1). The outside diameter side opening edge 221, the outside diameter side holding edge 211 and the connecting edge 223 are smoothly connected. The radius of curvature r1 of the outside diameter side opening edge 221 is smaller than the length from the axis L0 to the outside diameter side opening edge 221. Therefore, the length in the diametrical direction from the outside diameter side opening edge 221 to the outer circumferential surface 10b of the rotor core 10 becomes gradually smaller from the both ends 241 and 242 of the bridge part 24 in the circumferential direction toward the intermediate part 243 in the circumferential direction. That is, the diametrical direction length $\Delta L3$ at the intermediate part 243 is smaller than the lengths $\Delta L1$ and $\Delta L2$ of the bridge part 24 on the broken lines S1 and S2, while the bridge part 24 becomes the smallest thickness at the intermediate part 243. The lengths $\Delta L1$ and $\Delta L2$ at the both ends 241 and 242 of the bridge part 24 are substantially equal to each other.

The outside diameter side opening edge 221 may be formed not from a single circular arc, but a smooth composite curve comprised of a plurality of circular arcs combined together. In this case, it is sufficient that the maximum radius of curve become smaller than the length from the axis L0 to the most outside diameter part of the outside diameter side opening edge 211, in other words, become smaller than the radius of curvature of the circular arc which is offset from the outer circumferential surface 10b of the stator core 10 to the inside diameter side by exactly the amount of the minimum thickness $\Delta L3$. Here, "smooth" means formation of the curve of the outside diameter side opening edge 221 so as to suppress stress concentration. For example, when connecting a plurality of curves which differ in radii of curvature so as to form the outside diameter side opening edge 221, it is preferable to connect them so that two curves are geometrically contiguous in relationship, i.e., so that two curves have common tangents at the connecting points of the two curves.

The connecting edge 223 is formed projecting out to the outside of the opening part 22 in the circumferential direction. The opening part 22 which is surrounded by the outside diameter side opening edge 221, the inside diameter side opening edge 222, and the side face 303 of the magnet 30 exhibits a substantially triangular shape as a whole. The connecting edge 223 can be configured by a curve comprised of a single circular arc or by a smooth composite curve comprised of a plurality of circular arcs combined together. The radius of curvature of the circular arc which forms this connecting edge 223 (in the case of a composite curve, the minimum value of the radius of curvature) is smaller than the radii of curvature of the opening sides 221 and 222. In the present embodiment, the end of the inside diameter side opening edge 222 is provided with a projecting part 22b. However, disregarding projecting part 22b, the radius of curvature of the connecting edge 223 becomes the smallest in the edges which form the opening part 22.

Figure 4:
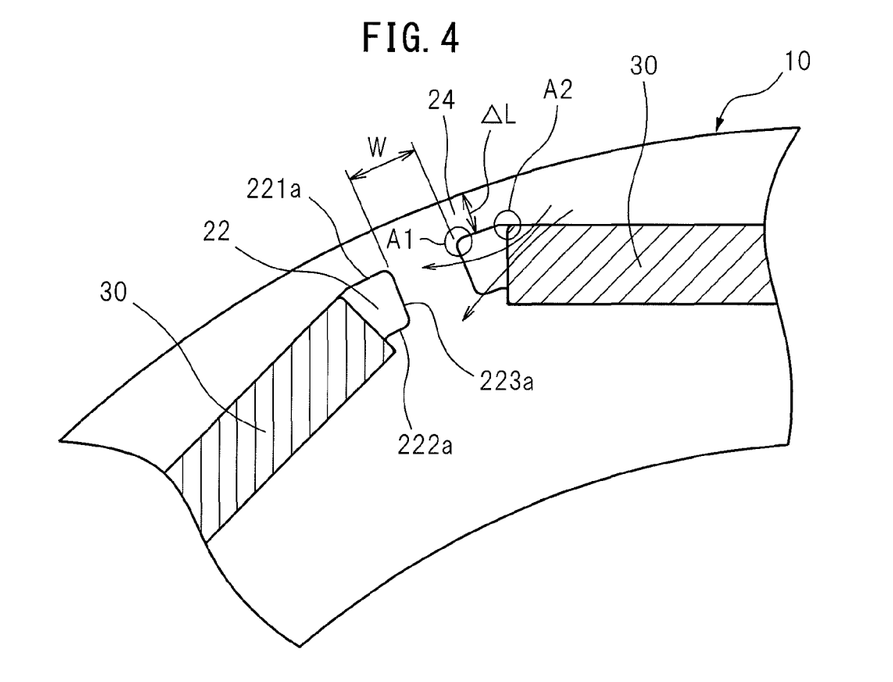
FIG. 4 is a view which shows a comparative example of FIG. 2.

By forming the connecting edge 223 into a projecting shape, the tooth part 23 is formed with a constricted part (point P2). For this reason, the tooth part 23 does not have a straight part of a constant width in the circumferential direction. The tooth part width W (q-axis tooth width) becomes the smallest at the constricted part. As opposed to this, as shown in FIG. 4 which shows the comparative example of the embodiment, if the opening part 22 is formed by the pair of edges 221a and 222a of the outside diameter side and the inside diameter side, and the edge 223a which extends in the diametrical direction, the tooth part 23 will have a straight part with a constant width W.

As shown in FIG. 2, the inside diameter side opening edge 222 has a straight part 22a which is slanted from the connecting edge 223 to the inside diameter side and a projecting part 22b which projects out to the outside in the diametrical direction at the boundary part of the opening edge 222 and the holding edge 212. The inside diameter side opening edge 222 is smoothly connected from the connecting edge 223 to the straight part 22a, projecting part 22b, and inside diameter side holding edge 212.

Figure 5:
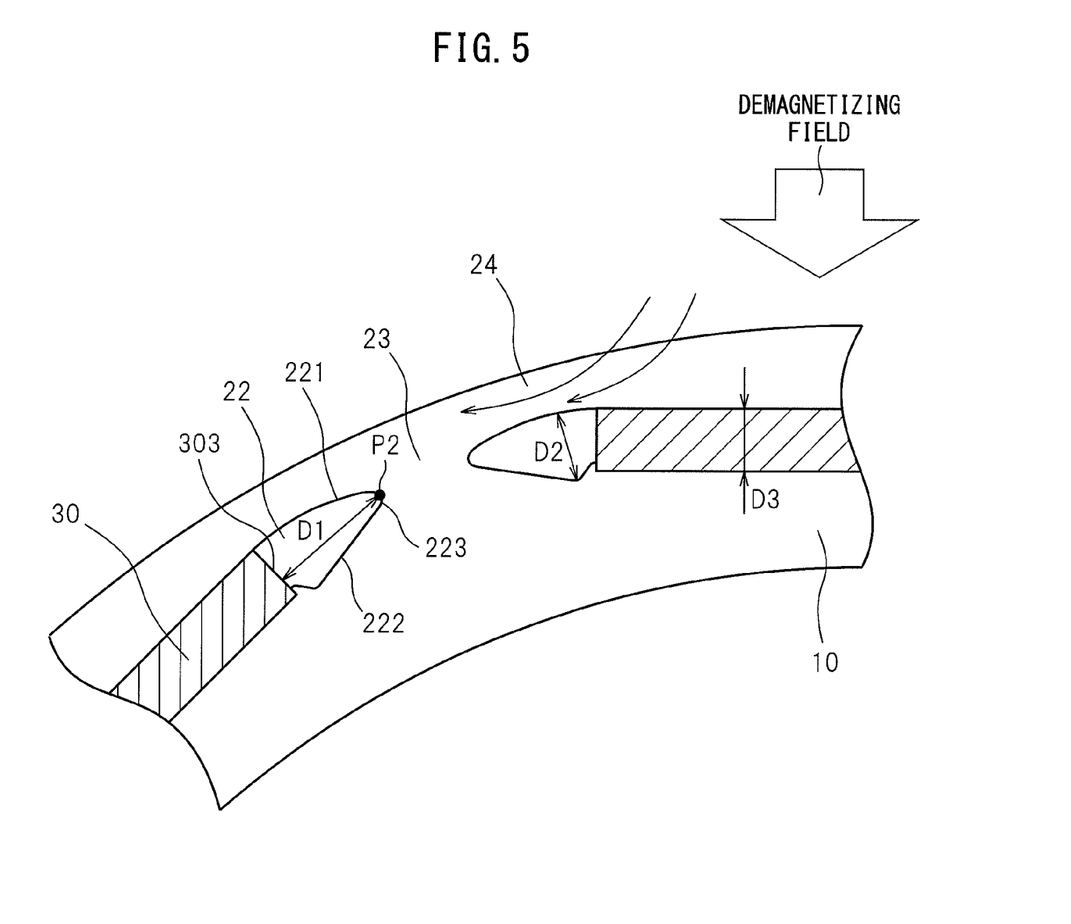
FIG. 5 is a view which explains the setting of the lengths of the opening parts of FIG. 2 in the circumferential direction and diametrical direction.

By providing the straight part 22a at a slant to the inside diameter side, it is possible to enlarge the maximum length of the opening part 22 in the diametrical direction (FIG. 5, D2). The projecting part 22b functions as a positioning part which restricts the position of the magnet 30 in the holding part 21. Since the projecting part 22b is provided at the inside diameter side opening edge 222 where the stress is smaller than the outside diameter side opening edge 221, the stress near the projecting part 22b is smaller than the maximum stress which acts on the bridge part 24.

At the electric motor 100 according to the present embodiment configured in the above way, if the rotor 1 rotates, stress acts on the bridge part 24 due to the centrifugal force of the magnet 30 and part at the outside of the slot 20 in the diametrical direction. In this case, the cross-sectional shape of the bridge part 24 rapidly changes at the end of the outside diameter side opening edge 221 (for example, the end 241 at the connecting edge 223 side). However, the opening part 22 becomes a substantially triangular shape, so the length $\Delta L1$ of the end 241 in the diametrical direction is longer than the length $\Delta L3$ of the intermediate part 243 in the diametrical direction. For this reason, the stress becomes the maximum at the intermediate part 243 where the cross-sectional area of the bridge part 24 becomes the smallest.

In the present embodiment, the outside diameter side opening edge 221 is configured by a smooth curve in which no straight part is included. For this reason, stress concentration at the intermediate part 243 can be suppressed and the maximum stress of the bridge part 24 can be reduced. That is, the stress which acts on the bridge part 24 gradually decreases toward the both ends 241 and 242 from the intermediate part 243 as the center. A change region is formed in which the stress gradually changes across a high range of the entire region of the bridge part 24. Due to this, it is possible to suppress the maximum stress of the intermediate part 243, and the rotor 1 can rotate at a high speed.

As opposed to this, as shown in FIG. 4, if configuring the edge 221a of the outside diameter side so that the diametrical direction length ΔL of the bridge part 24 becomes constant across the circumferential direction, the cross-sectional shape of the bridge part 24 rapidly changes at the both ends A1 and A2 of the edge 221*a* in the circumferential direction. In this case, the maximum stress occurs at the both ends A1 and A2 of the bridge part 24. The radii of curvature of the portions A1 and A2 where this maximum stress occurs are smaller than the radii of curvature of the portion where the maximum stress of the present embodiment occurs (intermediate part 243), so in the configuration of FIG. 4, the maximum stress easily becomes larger. As a result, the bridge part 24 breaks starting from the two locations of A1 and A2. The broken parts are liable to fly off in the diametrical direction and the electric motor 100 is liable to be greatly damaged.

When forming the edge 221*a* of the opening part 22 of FIG. 4, for example, in a straight shape along the tangential direction of the circle about the axis L0, the both ends of the bridge part 24 become the smallest in cross-sectional area. For this reason, the maximum stress at A1 and A2 becomes much larger and the bridge part 24 more easily breaks starting from A1 and A2.

In the rotor 1 of the present embodiment, the lengths of the opening part 22 in the circumferential direction and diametrical direction are preferably configured as follows. FIG. 5 is a view which explains the setting of the lengths of the opening part 22 in the circumferential direction and diametrical direction. As shown in FIG. 5, the shortest distance from a point P2 on the connecting edge 223 where the width of the tooth part 23 becomes the minimum to the side surface 303 of the magnet 30 is defined as D1, the maximum value of the length of the opening part 22 in the diametrical direction is defined as D2, and the thickness of the magnet (distance between pole faces) is defined as D3.

At this time, D1 is longer than D2, while D2 is longer than D3. For example, D1 is more than 1.5 times D3. Therefore, the opening part 22 has sufficient lengths in the circumferential direction and diametrical direction. For this reason, as shown by the arrow of FIG. 5, if a magnetic field in the demagnetizing direction acts on the rotor 1, the demagnetizing field passes through the bridge part 24 where the magnetic resistance is smaller than the opening part 22 and the magnet 30 becomes harder to demagnetize.

As opposed to this, as shown in FIG. 4, when the lengths of the opening part 22 in the circumferential direction and diametrical direction are shorter than the thickness of the magnet 30, the magnetic resistance of the opening part 22 does not become sufficiently large and the demagnetizing field passes through the opening part 22 as shown by the arrows of FIG. 4. As a result, the corner parts of the magnet 30 are liable to be demagnetized.

According to the present embodiment, the following functions and effects can be exhibited:

(1) The slot 20 of the rotor 1 is provided with a holding part 21 in which magnet 30 is to be held and opening parts 22 which are formed at the both sides of the holding part 21 in the circumferential direction. That is, the mutually facing outside diameter side holding edge 211 and inside diameter side holding edge 212 which extend in the circumferential direction are used to form the holding part 21 while the outside diameter side opening edge 221 which extends from the outside diameter side holding edge 211 in the circumferential direction, the inside diameter side opening edge 222 which extends from the inside diameter side holding edge 212 in the circumferential direction, and the connecting edge 223 which connects the opening edges 221 and 222 are used to form the opening part 22. Further, the outside diameter side opening edge 221 is formed in a curved shape so that the length from the outside diameter side opening edge 221 to the outer circumferential surface 10*b* of the rotor core 10 in the diametrical direction gradually becomes smaller from the both ends 241, 242 in the circumferential direction to the intermediate part 243 in the circumferential direction. That is, the outside diameter side opening edge 221 is formed projecting out toward the outside in the diametrical direction, and the thickness of the bridge part 24 at the intermediate part 243 in the diametrical direction is made to become the smallest.

Due to this, the bridge part 24 is formed so that the cross-sectional area in the diametrical direction becomes the smallest at the intermediate part 243 and the maximum stress acts at the intermediate part 243 where the cross-sectional shape gradually changes. As a result, the maximum stress which acts on the bridge part 24 can be reduced and the rotor 1 can be made to rotate at a high speed. The maximum stress acts at a single location (intermediate part 243) of the bridge part 24 rather than a plurality of locations, so even if that portion breaks, the bridge part 24 can be prevented from flying off to the stator 2 side.

(2) The connecting edge 223 is formed into a curved shape which projects out toward the outside of the opening part 22 in the circumferential direction, so it is possible to easily increase the cross-sectional area of the end 241 of the bridge part 24 in the circumferential direction and it is possible to reduce the stress of the end 241 in the circumferential direction. Further, since the opening part 22 becomes a substantially triangular shape, the magnetic flux can be made to efficiently run along the outside diameter side opening edge 221 and the inside diameter side opening edge 222 of the opening part 22.

(3) The outside diameter side holding edge 211 and the inside diameter side holding edge 212 which form the holding part 21 of the slot 20 are formed flat and in parallel with each other, so the holding part 21 has no unevenness and stress concentration at the holding part 21 can be suppressed. Further, since it is possible to use a rectangular cross-section magnet 30 corresponding to the shapes of the holding part 21, the configuration of the magnet 30 is also easy.

(4) The rotor core 10 has a circular arc shaped outer circumferential surface 10*b* free of unevenness across the entire circumference, so the thickness of the bridge part 24 in the diametrical direction smoothly changes and stress concentration can be lightened. Further, shape-like stress concentration at the outer circumferential surface 10*b* can also be prevented.

(5) If configuring the magnets 30 by rare earth magnets with a higher magnetic energy than ferrite magnets, it is possible to obtain the necessary magnetic flux by fewer magnets and possible to keep down the volume of the magnets 30 for obtaining the necessary torque. As a result, the centrifugal force which acts due to the mass of the magnets 30 is decreased and the rotor 1 can be made higher in speed.

(6) The length D1 of the opening part 22 from the point P2 on the connecting edge 223 where the width W of the tooth part 23 of the rotor core 10 becomes the smallest to the side face 303 of the magnet 30 is made longer than the thickness D3 of the magnet 30 in the diametrical direction. Due to this, the magnetic resistance at the opening part 22 becomes greater. Therefore, when a magnetic field in the demagnetizing direction acts, it is possible to reduce the demagnetizing field which passes through the corner parts of the magnet 30 and the opening part 22 to the tooth part 23.

(7) The maximum length D2 of the opening part 22 in the diametrical direction is made longer than the thickness D3 of the magnet 30 in the diametrical direction, so the magnetic resistance at the opening part 22 becomes greater in the diametrical direction as well. Therefore, the demagnetizing action at the corner parts of the magnet 30 can be kept down.

(8) The inside diameter side opening edge 222 of the opening part 22 is provided with a projecting part 22b which projects out toward the outside in the diametrical direction, so the projecting part 22b can be used to easily position the magnet 30 at the holding part 21. In this case, the inside diameter side of the opening part 22 is greater in thickness in the diametrical direction compared with the outside diameter side and the stress generated is small, so the stress near the projecting part 22b need not become excessive.

(9) The inside diameter side opening edge 222 is provided with a straight part 22a which extends straight in the circumferential direction, so magnetic flux can be smoothly passed to the inside diameter side pole face 302. That is, the magnetic flux runs by the shortest distance without drawing an extraneous arc and is efficient.

In the above embodiment, the number of poles of the rotor 1 is made twelve poles. However, the number of poles may be increased or decreased from this. For example, when four poles, six poles, eight poles, or other small number of poles, the widths of the magnets 30 in the circumferential direction become greater, the mass of the magnets 30 increases, and the stress which acts on the bridge parts 24 also increases. In this case, by dividing the slots 20 and the magnets 30 into two in the circumferential direction and interposing the rotor core 10 between the divided pairs of slots 20 and 20, it is possible to lighten the stress which acts on the bridge parts 24. Below, this point will be explained.

Figure 6:
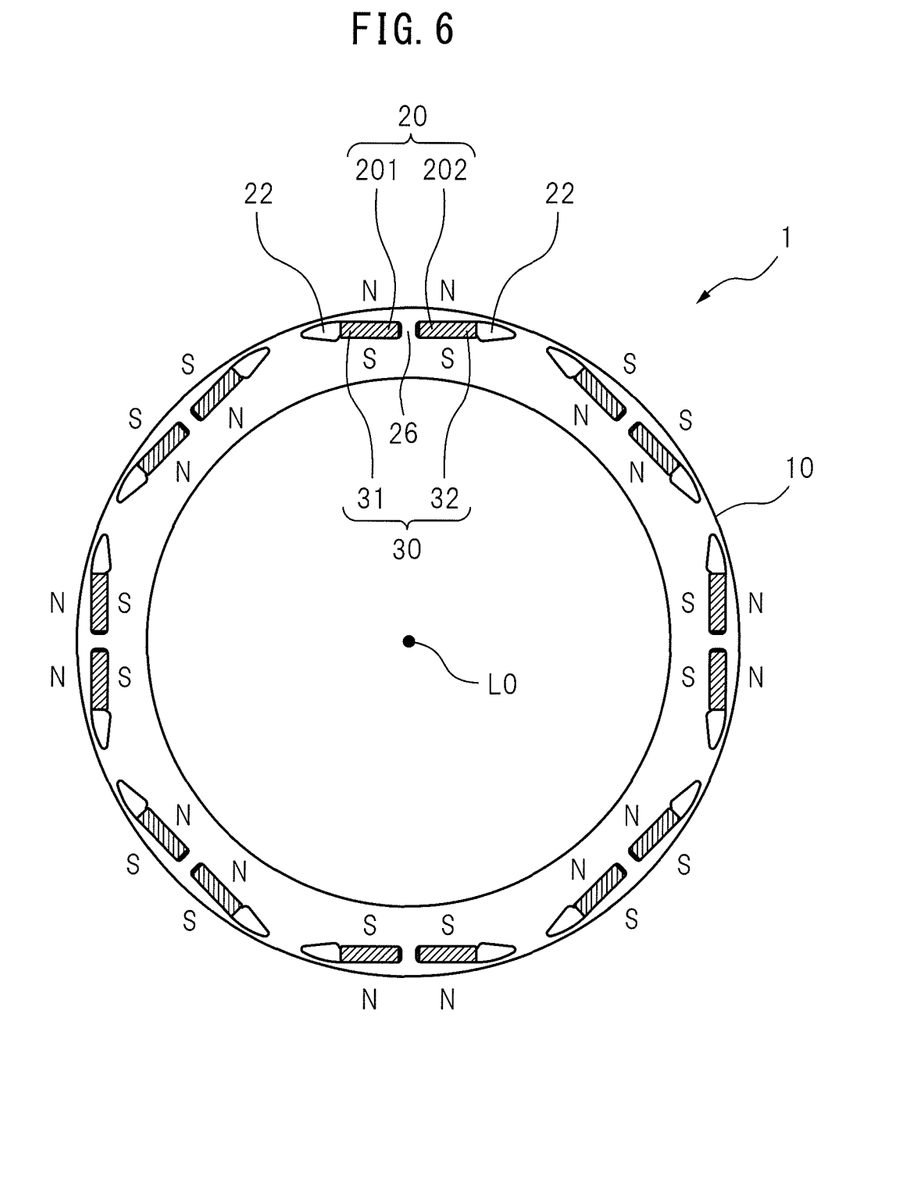
FIG. 6 is a view which shows a modification of FIG. 1.

FIG. 6 is a view which shows one example of a rotor 1 which divides the slots 20 and magnets 30 into two in the circumferential direction. As shown in FIG. 6, the slots 20 are divided into two through intermediate parts in the circumferential direction, i.e., the dividing parts 26 of the rotor core 10. Pairs of slots 201 and 202 (first slots 201, second slots 202) are aligned along tangential directions of a circle about the axis L0. The first slots 201 and second slots 202 house magnets 31 and 32 so that the same poles are positioned in the diametrical direction.

If providing dividing parts 26 at the rotor core 10 in this way to divide the slots 20 into first slots 201 and second slots 202 in the circumferential direction, it is possible to have the dividing parts 26 receive the centrifugal force. As a result, the load which is applied to the bridge parts 24 is lightened and the maximum stress of the bridge parts 24 can be reduced.

Figure 7:
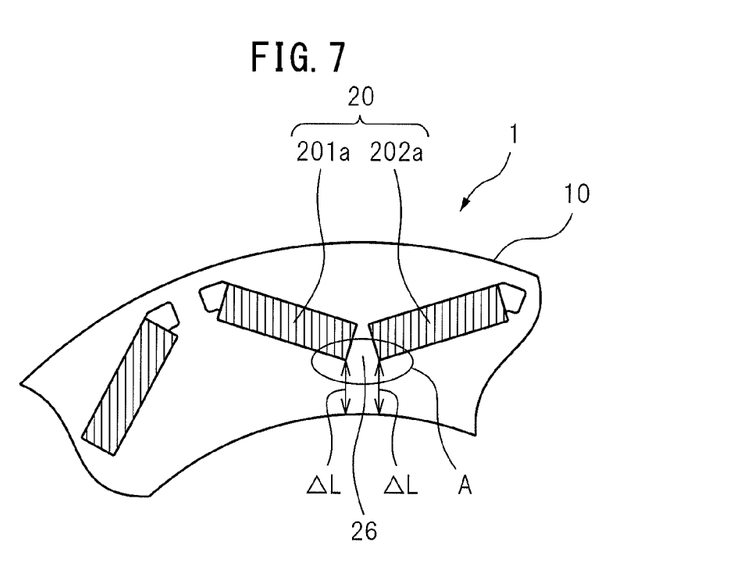
FIG. 7 is a view which shows a comparative example of FIG. 6.

Further, the first slots 201 and the second slots 202 are aligned straight along the tangential direction of a circle centered on the axis L0, so the dividing parts 26 can be positioned near the outside diameter of the rotor core 10, the inside diameter of the rotor core 10 can be easily enlarged, and the generation of excessive stress at the inside diameter part of the rotor core 10 can be prevented. That is, for example, as shown in FIG. 7, if arranging the pair of slots 201a and 202a in a V-shape, the wall thickness ΔL of the rotor core 10 at the end A of the slots 20 in the circumferential direction becomes extremely small and an excessive stress acts on the end A. To avoid this, it is necessary to reduce the inside diameter of the rotor core 10 and increase the wall thickness ΔL. Therefore, enlargement of the inside diameter of the rotor core 10 is inhibited.

In the above embodiment (FIG. 2), the outside diameter side holding edge 211 (first outside diameter surface) and the inside diameter side holding edge 212 (first inside diameter surface) are formed in straight shapes. However, as long as each one faces each other and extends in the circumferential direction, the configuration of the first outside diameter surface and the first inside diameter surface, i.e., the configuration of the holding part 21, is not limited to the above. Further, although the outside diameter side opening edge 221 (second outside diameter surface) which extends from the outside diameter side holding edge 211 in the circumferential direction, the inside diameter side opening edge 222 (second inside diameter surface) which extends from the inside diameter side holding edge 212 in the circumferential direction, and the connecting edge 223 (connecting surface) which connects the opening edges 221 and 222 formed the opening part 21, the configurations of these second outside diameter surface, second inside diameter surface, and connecting surface, i.e., the configuration of the opening part 22, is not limited to that explained above.

In the above embodiment, the connecting edge 223 is formed projecting toward the outside in the circumferential direction and the opening part 22 is made a substantially triangular shape. However, so long as the outside diameter side opening edge 221 is formed into a curved shape so that the distance in the diametrical direction from the outside diameter side opening edge 222 to the outer circumferential surface 10b of the rotor core 10 (length of bridge part 24 in diametrical direction) gradually becomes smaller from the both ends 241 and 242 in the circumferential direction toward the intermediate part 243 in the circumferential direction, the shape of the opening part 22 is not limited to that explained above. For example, it may be a substantially square shape. Therefore, the shape of the tooth part 23 (non-slot part) between a pair of opening parts 22 which adjoin each other in the circumferential direction is not limited to the one explained above. Even when the tooth part 23 has a straight part, the length D1 of the opening part 22 from the point on the connecting edge 223 where the width W of the tooth part 23 becomes smallest to the side face 303 of the magnet 30 is preferably longer than the thickness D3 of the diametrical direction of the magnet 30.

Figure 8:
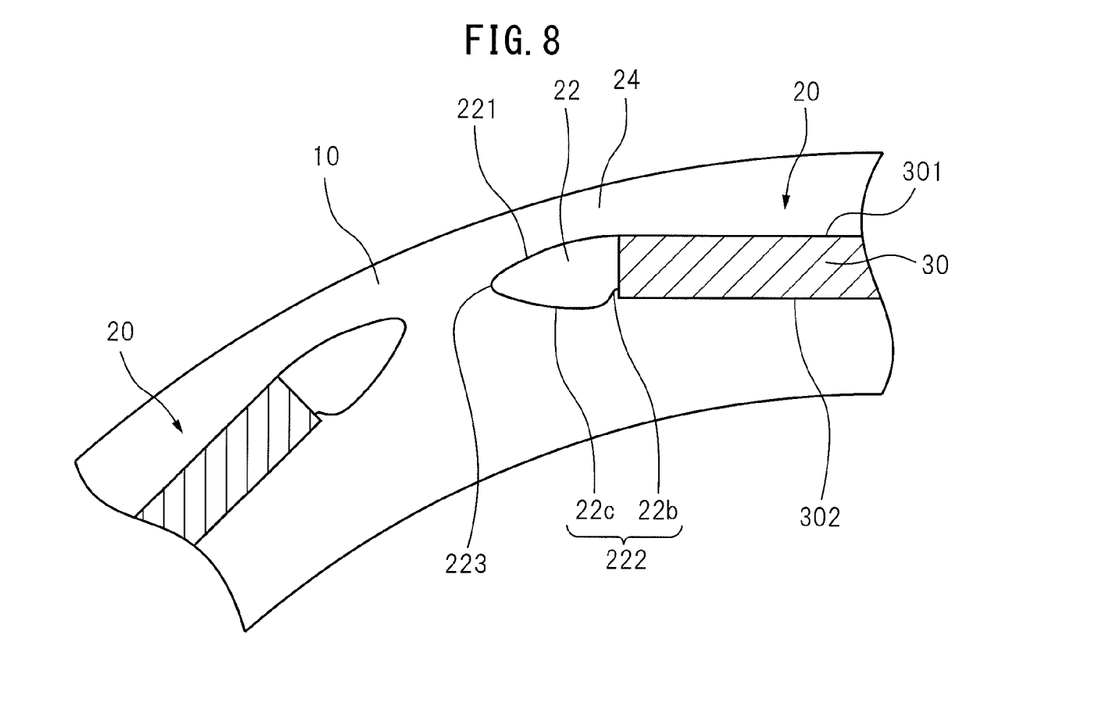
FIG. 8 is a view which shows a modification of FIG. 2.

In the above embodiment, the inside diameter side opening edge 222 is provided with a straight part 22a and a projecting part 22b for positioning use. However, various shapes of the inside diameter side opening edge 222 may be considered. For example, as shown in FIG. 8, instead of the straight part 22a, it is possible to provide a curved part 22c which projects out at the inside of the diametrical direction. By this as well, magnetic flux smoothly passes to the inside diameter side pole face 302 and an efficient flow of magnetic flux becomes possible. The inside diameter side opening edge 222 may have both a straight part 22a and curved part 22c. In the above embodiment, the outer circumferential surface 10b of the rotor core 10 is formed into a circular arc shape with no unevenness across the entire circumference. However, so long as the outer circumferential surface of at least the bridge part 24 in the outer circumferential surface 10b is formed to a circular arc shape with no unevenness, there may be unevenness at the other locations. For example, it is possible to provide a recessed part at the outer circumferential surface of the tooth part 23 where the effect on the stress state is small.

The rotor core 10 is formed into an integral part by stacking a plurality of electrical steel sheets in the axial direction. The plurality of electrical steel sheets are preferably comprised of bonded steel sheets which are joined by a binder. For example, the surfaces of the electrical steel sheets (entire surfaces other than the slots 20) are coated with a thermoplastic binder and the plurality of electrical steel sheets are then stacked. The stacked electrical steel sheets are subjected to a predetermined compressive force in the axial direction using a fixture, etc. Furthermore, the electrical steel sheets to which the compressive force is applied are placed in an electrical oven, are heated to a temperature at which the binder melts, then are cooled and taken out from the electrical oven. Due to this, a plurality of electrical steel sheets are joined together through a binder. If using a binder to form a rotor core 10 in this way, there is no need to provide a structurally joining part for joining the plurality of electrical steel sheets and it is possible to keep down the occurrence of new stress concentration.

As another method of joining the electrical steel sheets, for example, joining them by swaging and joining them by a bolt (tie bolt) may be considered. When using swaging to join the electrical steel sheets, first, parts of the electrical steel sheets (for example, inside peripheral edges) are sheared off by a die. The sheared locations are bent and plastically deformed in the axial direction to form projecting parts and to form recessed parts at the inside peripheral edges of the electrical steel sheets. The projecting parts are pushed into the recesses of the adjoining electrical steel sheets to join the electrical steel sheets. In this case, the projecting parts and recessed parts become swaged parts. The swaged parts are present at a plurality of locations in the circumferential direction. Stress concentration occurs at the swaged parts, so joining by swaging is unsuitable for application to a rotor core 10 which rotates at a high speed.

Further, when using a tie bolt to connect the electrical steel sheets, each electrical steel sheet is drilled to form a through hole. A tie bolt is inserted in the through holes of the stacked electrical steel sheets across the entire axial direction and fastened by nuts at the ends of the tie bolt. If fastening the plurality of electrical steel sheets through a tie bolt in this way, the through holes become new locations for stress concentration, so this case as well is unsuited for application to a rotor core 10 which rotates at a high speed.

So long as arranging the stator 2 around the rotor 1 to form an internal permanent magnet synchronous motor 100, the electric motor 100 is not limited in configuration to that which is shown in FIG. 1. In the above embodiment, the internal permanent magnet synchronous motor 100 is used for driving the spindle in a machine tool. However, it may be similarly applied to other machines.

The above embodiment can be freely combined with one or more of the modifications.

According to the present invention, the second outside diameter surface of the opening part of the slot is formed in a curved shape so that the distance to the outer circumferential surface of the rotor core in the diametrical direction gradually becomes smaller toward the intermediate part in the circumferential direction. Therefore, the cross-sectional area in the diametrical direction at the intermediate part of the bridge part where the cross-sectional shape gradually changes become smallest, and the maximum stress which acts on the bridge part can be reduced.

Above, the present invention was explained in relation to preferred embodiments, but a person skilled in the art would understand that various corrections and changes may be made without departing from the scope of disclosure of the later set forth claims.

The invention claimed is:

1. A rotor of an internal permanent magnet synchronous motor comprising:
   a rotor core rotating about an axis;
   a plurality of slots formed in the rotor core at a plurality of locations in a circumferential direction and extending in parallel to the axis; and
   a plurality of permanent magnets housed in the plurality of slots and having a cross-sectional rectangular shapes, the plurality of permanent magnets being housed so that, in the slots adjoining each other in the circumferential direction, poles different from each other in a diametrical direction are positioned, wherein
   each of the plurality of slots comprises
      a holding part formed between a first outside diameter surface extending in the circumferential direction and a first inside diameter surface facing the first outside diameter surface and extending in the circumferential direction at an inside from the first outside diameter surface in the diametrical direction, so as to hold each of the plurality of permanent magnets, and
      an opening part formed at both sides of the holding part in the circumferential direction, the opening part being formed by a second outside diameter surface extending from the first outside diameter surface in the circumferential direction, a second inside diameter surface extending from the first inside diameter surface in the circumferential direction, and a connecting surface connecting the second outside diameter surface and the second inside diameter surface,
   the second outside diameter surface is formed to a smooth curved shape and does not include a flat face part so that a distance to an outer circumferential surface of the rotor core in the diametrical direction gradually becomes smaller from both ends of the second outside diameter surface in the circumferential direction to an intermediate part in the circumferential direction,
   the connecting surface is comprised of a curved surface projecting out toward an outside of the opening part in the circumferential direction so that the cross-sectional view of the opening part which is formed by the second outside diameter surface, the second inside diameter surface, and an end face of the permanent magnet is a substantially triangular shape, and
   a maximum length of the opening part in the diametrical direction is longer than a thickness of the permanent magnet in the diametrical direction.

2. The rotor of the internal permanent magnet synchronous motor according to claim 1, wherein
   the first outside diameter surface and the first inside diameter surface are formed to be flat and to be mutually parallel.

3. The rotor of the internal permanent magnet synchronous motor according to claim 1, wherein
   the rotor core has the outer circumferential surface of a circular arc shape with no unevenness across its entire circumference.

4. The rotor of then internal permanent magnet synchronous motor according to claim 1, wherein
   the rotor core has dividing parts dividing the plurality of slots into first slots and second slots in the circumferential direction, and the permanent magnets are housed in the first slots and the second slots so that the same poles are positioned in the diametrical direction.

5. The rotor of the internal permanent magnet synchronous motor according to claim 4, wherein
the first slots and the second slots are aligned along tangents in a circumferential direction of a circle centered about the axis.

6. The rotor of the internal permanent magnet synchronous motor according to claim 1, wherein
the permanent magnets are rare earth magnets with higher magnetic energy than ferrite magnets.

7. The rotor of the internal permanent magnet synchronous motor according to claim 1, wherein
the rotor core has a non-slot part between each pair of the opening parts adjoining each other in the circumferential direction,
a length of the opening part from a point on the connecting surface where the non-slot part becomes smallest in width to an end face of the permanent magnet in the circumferential direction is longer than a thickness of the permanent magnet in the diametrical direction.

8. The rotor of the internal permanent magnet synchronous motor according to claim 1, wherein
the second inside diameter surface has a projecting part projecting out toward an outside in the diametrical direction to position the permanent magnet.

9. The rotor of the internal permanent magnet synchronous motor according to claim 1, wherein
the second inside diameter surface has at least one of a straight part and a curved part projecting out to an inside in the diametrical direction, in the circumferential direction.

10. The rotor of the internal permanent magnet synchronous motor according to claim 1, wherein
the rotor core is comprised of a plurality of electrical steel sheets stacked together, and the electrical steel sheets adjoining each other in the axial direction are joined together through a binder.

11. An internal permanent magnet synchronous motor comprising
a rotor according to claim 1, and
a stator arranged around the rotor.

* * * * *